(12) United States Patent
Chiang et al.

(10) Patent No.: US 9,383,885 B2
(45) Date of Patent: Jul. 5, 2016

(54) HIT TESTING CURVE-BASED SHAPES USING POLYGONS

(75) Inventors: Nick Chiang, Redmond, WA (US); Justin Mason, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 270 days.

(21) Appl. No.: 13/495,319

(22) Filed: Jun. 13, 2012

(65) Prior Publication Data

US 2013/0339883 A1 Dec. 19, 2013

(51) Int. Cl.
*G06F 3/048* (2013.01)

(52) U.S. Cl.
CPC ...................... *G06F 3/048* (2013.01)

(58) Field of Classification Search
CPC ....................................... G06F 3/048
See application file for complete search history.

(56) References Cited

U.S. PATENT DOCUMENTS

| | | | | |
|---|---|---|---|---|
| 4,855,934 A | * | 8/1989 | Robinson | 345/582 |
| 5,491,494 A | | 2/1996 | Cornett et al. | |
| 6,421,052 B1 | * | 7/2002 | McGuire | 345/441 |
| 6,791,549 B2 | * | 9/2004 | Hubrecht et al. | 345/473 |
| 7,564,459 B2 | * | 7/2009 | Loop et al. | 345/442 |
| 7,889,209 B2 | * | 2/2011 | Berger et al. | 345/585 |
| 2002/0191034 A1 | * | 12/2002 | Sowizral et al. | 345/854 |
| 2004/0233233 A1 | | 11/2004 | Salkind et al. | |
| 2007/0097123 A1 | * | 5/2007 | Loop et al. | 345/442 |
| 2011/0296307 A1 | * | 12/2011 | Inami et al. | 715/719 |

OTHER PUBLICATIONS

Live Geometry—Retrieved Date: Jul. 22, 2011. 28 pages. Obtained at: http://livegeometry.codeplex.com/SourceControl/list/changesets?size=2147483647.
Hit Test Curve—Retrieved Date: Jul. 22, 2011. 6 pages. Obtained at: http://www.vbforums.com/showthread.php?t=631317.
How to: Hit Test Using Geometry as a Parameter—Retrieved Date: Jul. 22, 2011. 1 page. Obtained at: http://msdn.microsoft.com/en-us/library/ms748343.aspx.
User Interfaces in C#(c) Windows Forms and Custom Controls—Retrieved Date: Jul. 22, 2011. 4 pages. Obtained at: http://flylib.com/books/en/2.742.1.98/1/.
Curved Shapes and Curved Edge Shapes?—Retrieved Date: Jul. 22, 2011. 4 pages. Obtained at: http://www.box2d.org/forum/viewtopic.php?f=4 t=5537.

* cited by examiner

*Primary Examiner* — William Titcomb
(74) *Attorney, Agent, or Firm* — Damon Rieth; Tom Wong; Micky Minhas (57) ABSTRACT

Upon receiving an input comprising an area of a user interface, a user interface element associated with the area of the user interface may be identified and a polygon-based representation of the at least one user interface element may be created. If the input is determined to comprise a selection of the user interface element according to the polygon-based representation, an operation associated with the user interface element may be performed.

20 Claims, 9 Drawing Sheets

HIT TESTING CURVE-BASED SHAPES USING POLYGONS

BACKGROUND

Different computing platforms utilize differing software options to define and display user interface elements. For example, some systems define user interface element boundaries using curves while others use primitive shapes such as triangles and/or other polygons. Conventional systems often have difficulty defining element edges when passing data between applications, because the translation between different styles does not result in a 1:1 mapping of the element's edges.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Upon receiving an input comprising an area of a user interface, a user interface element associated with the area of the user interface may be identified and a polygon-based representation of the at least one user interface element may be created. If the input is determined to comprise a selection of the user interface element according to the polygon-based representation, an operation associated with the user interface element may be performed.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Many computing devices now use touch-sensitive screens as input devices. When a user provides an input, such as by gesturing and/or touching the screen with a finger and/or stylus, the computing device may receive the input as a selection of an area of the screen. The area may comprise, for example, a pixel, a rectangular area, and/or an elliptical area that may be centered on the point touched by the user. The device then needs to determine which displayed user interface element has been selected.

In some devices, this hit-testing process may be performed by an underlying utility that may be called via an application programming interface (API). The API may receive the selection area and an identification of any user interface elements in that area. The elements may have been rendered as open (e.g., a line or a hollow shape) and/or closed (e.g., a solid shape) two dimensional objects and/or as three dimensional objects. The rendering may make use of various rendering techniques, such as curve-based models that may be represented as mathematical equations and/or vector graphics.

The API, however, may only accept shapes that have been translated from curves into representative polygons. Upon receiving an input area, a Boolean operation may be performed on the area to determine which object may have been touched. That is, each object in the user interface may be examined to determine whether or not the shape intersects and/or falls entirely within the input area. These objects and/or the portions of the object within the touched area may then be translated into polygon-based representations.

This translation may result in more accurate identification of the user's desired element by identifying each of the elements within the selection area and ranking their likelihood of being the target object. For example, when an object is within the selection area but its display is obscured by a second object, the second object may be more likely to be the target object. For hollow shapes, a selection in the hollow area may be interpreted as a selection of the shape. In some situations, some objects within the selection area may not be selectable, such as user interface elements that are only selectable in certain contexts. These non-selectable objects may be eliminated as part of the identification process as there is no need to rank them as possibly being the target object.

Figure 1:
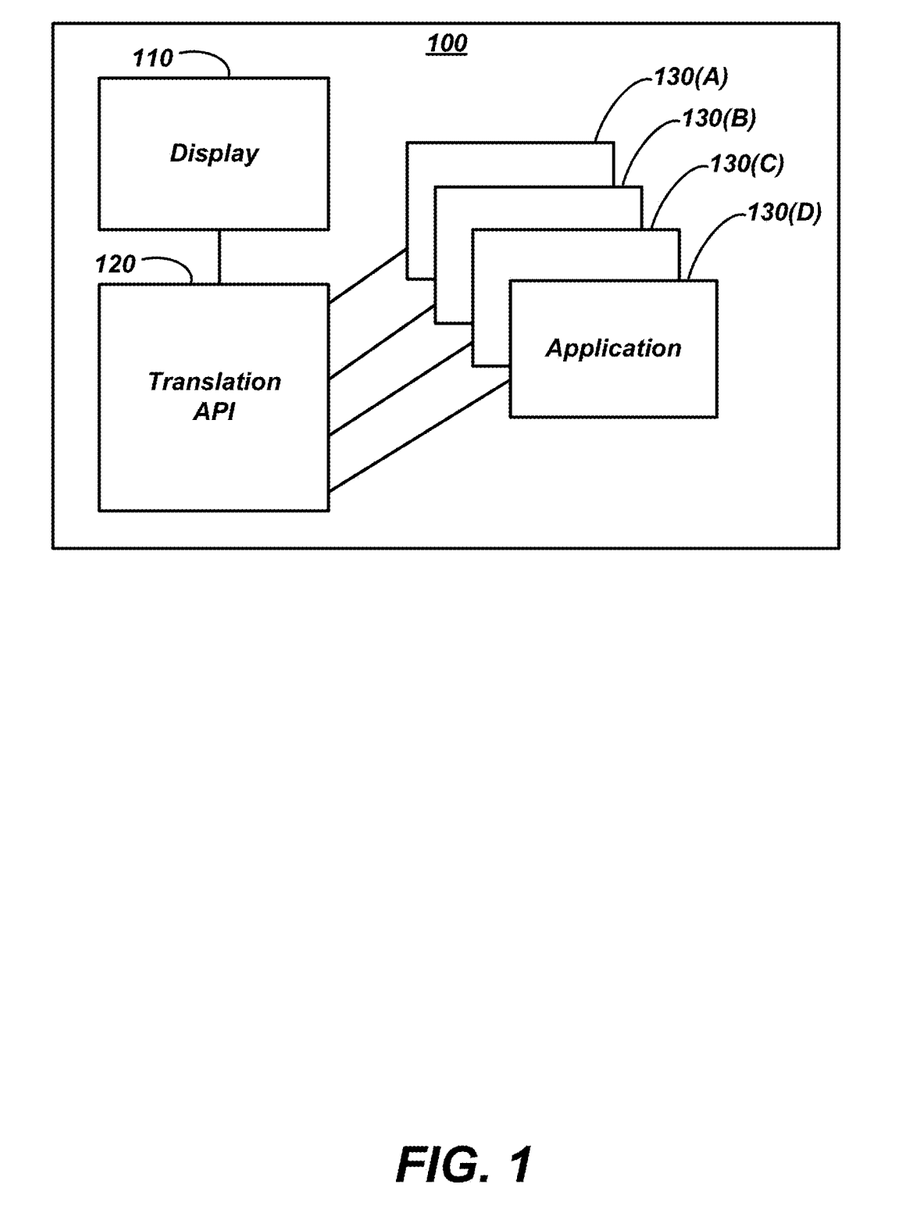
FIG. 1 is a block diagram of an operating environment.

FIG. 1 is a block diagram of a user device 100 that may provide shape hit testing. User device 100 may comprise a display 110 such as a touchscreen operative to receive input from a user. The user may comprise a human user, but may also comprise a robot, an automated solution, a synthesized input, etc. Display 110 may communicate inputs via a translation application programming interface (API) 120 to at least one of a plurality of applications 130(A)-(D) that may execute on user device 100. User device 100 may comprise a computing device such as that described in more detail below with respect to FIG. 4.

Figure 2A:
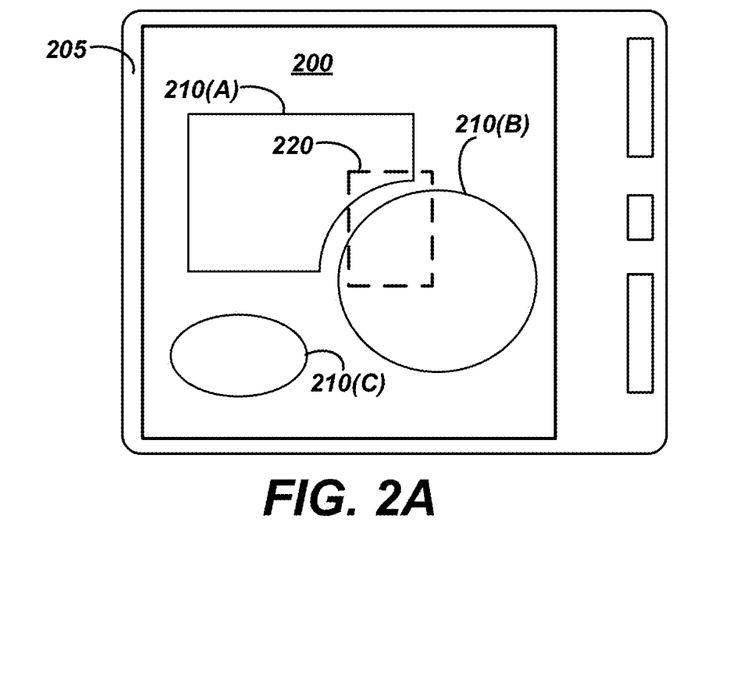
FIGS. 2A-2F illustrate examples of shape hit testing in a user interface.

FIG. 2A illustrates an example user interface 200 comprising a tablet device 205 displaying a plurality of vector-based shapes 210(A)-(C). An input to user interface 200 may comprise a selection area 220. Translation API 120 may translate vector-based shapes 210(A)-(C) into polygon-based shapes for hit-testing. Consistent with embodiments of this disclosure, translation API 120 may translate all of the currently displayed shapes on user interface 200 and/or may translate only those shapes displayed within and/or in a configurable proximity to selection area 220. Tablet device 205 as illustrated in FIGS. 2A-2F are not limiting of a vast number of computing device configurations that may be utilized for practicing embodiments of the invention, as will be described in further detail below.

Figure 2B:
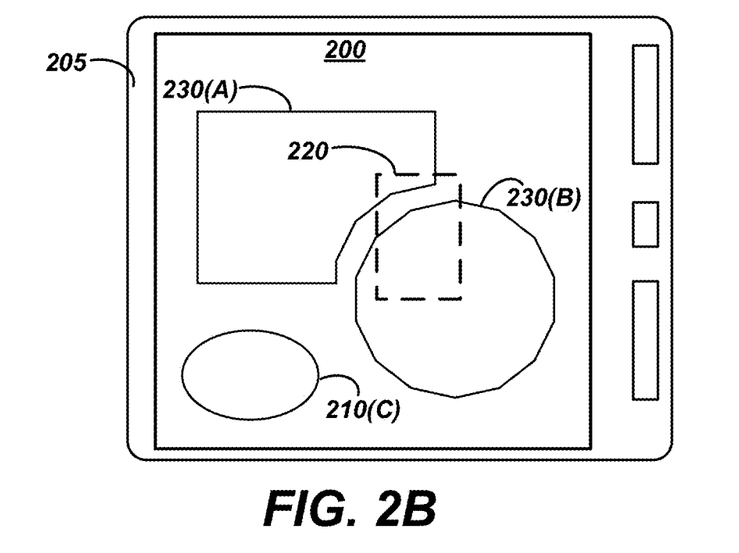

FIG. 2B illustrates example user interface 200 comprising a plurality of polygon-based shapes 230(A)-(B). In this example, vector-based 210(C) is not within selection area 220 and so is not translated into a polygon-based representation.

Figure 2C:
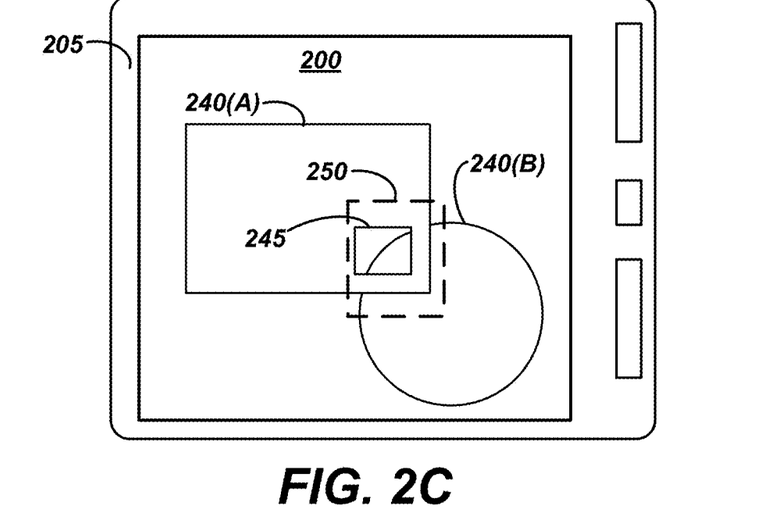

FIG. 2C illustrates example user interface 200 comprising a second plurality of vector-based shapes 240(A)-(B). In this example, vector-based shape 240(A) comprises a hollow area 245 through which a portion of vector-based shape 240(B) may be displayed. An input may comprise a second selection area 250 that includes hollow area 245 and portions of vector-based shapes 240(A) and 240(B).

Figure 2D:
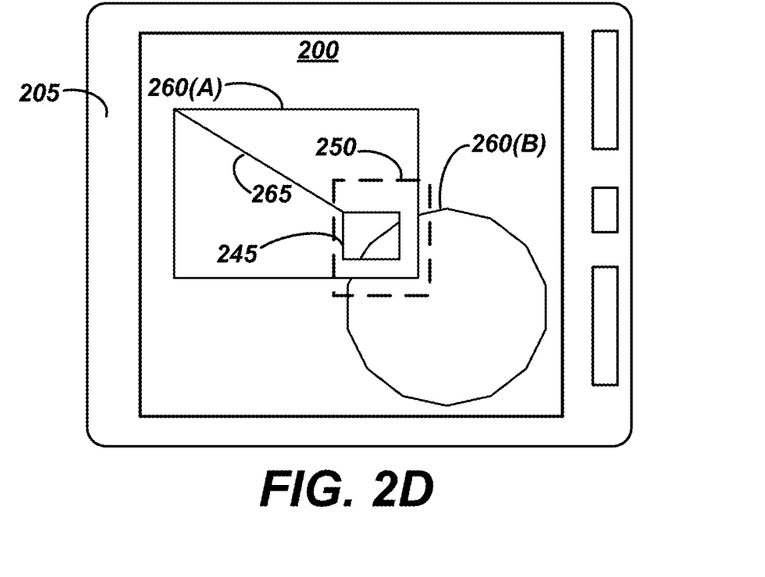

FIG. 2D illustrates example user interface 200 comprising a second plurality of polygon-based shapes 260(A)-(B). To create polygon-based shape 260(A) that represents vector-based shape 240(A), translation API 120 may create a cut 265 to create a single contiguous outline for the shape.

Figure 2E:
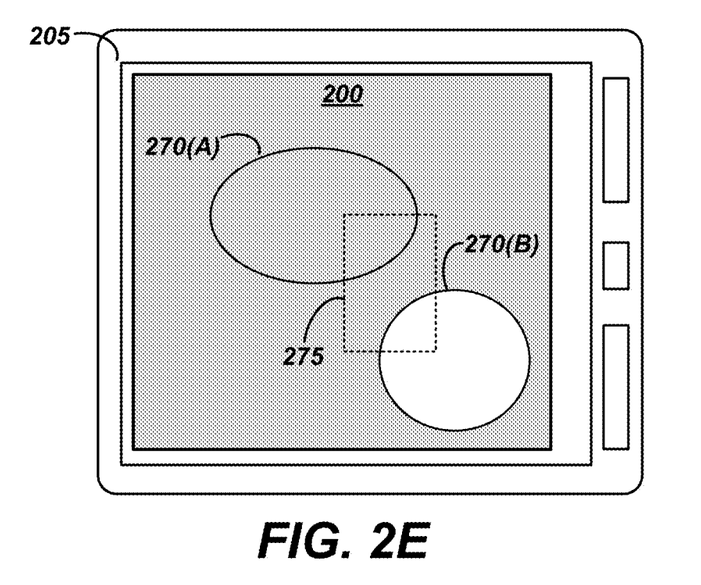

FIG. 2E illustrates example user interface 200 comprising a third plurality of vector-based shapes 270(A)-(B). In this example, vector-based shape 270(A) comprises a line. An input may comprise a third selection area 275.

Figure 2F:
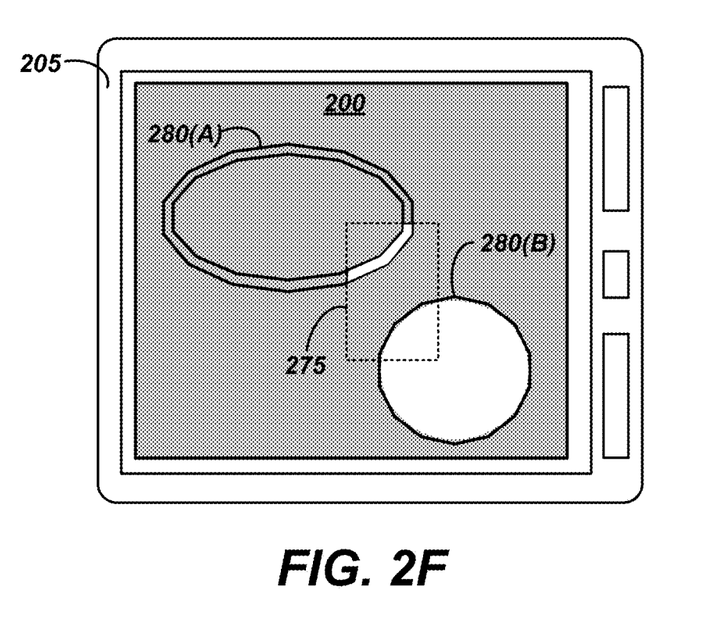

FIG. 2F illustrates example user interface 200 comprising a second plurality of polygon-based shapes 280(A)-(B). To create polygon-based shape 280(A) to represent vector-based shape 270(A), translation API 120 may pad the line by a configurable amount related to a slop area around the line, which may be defined in pixels. This padding may be applied to create polygon-based representations of open path lines (i.e., lines with distinct, unconnected endpoints) and/or closed path lines that form a hollow shape.

Figure 3:
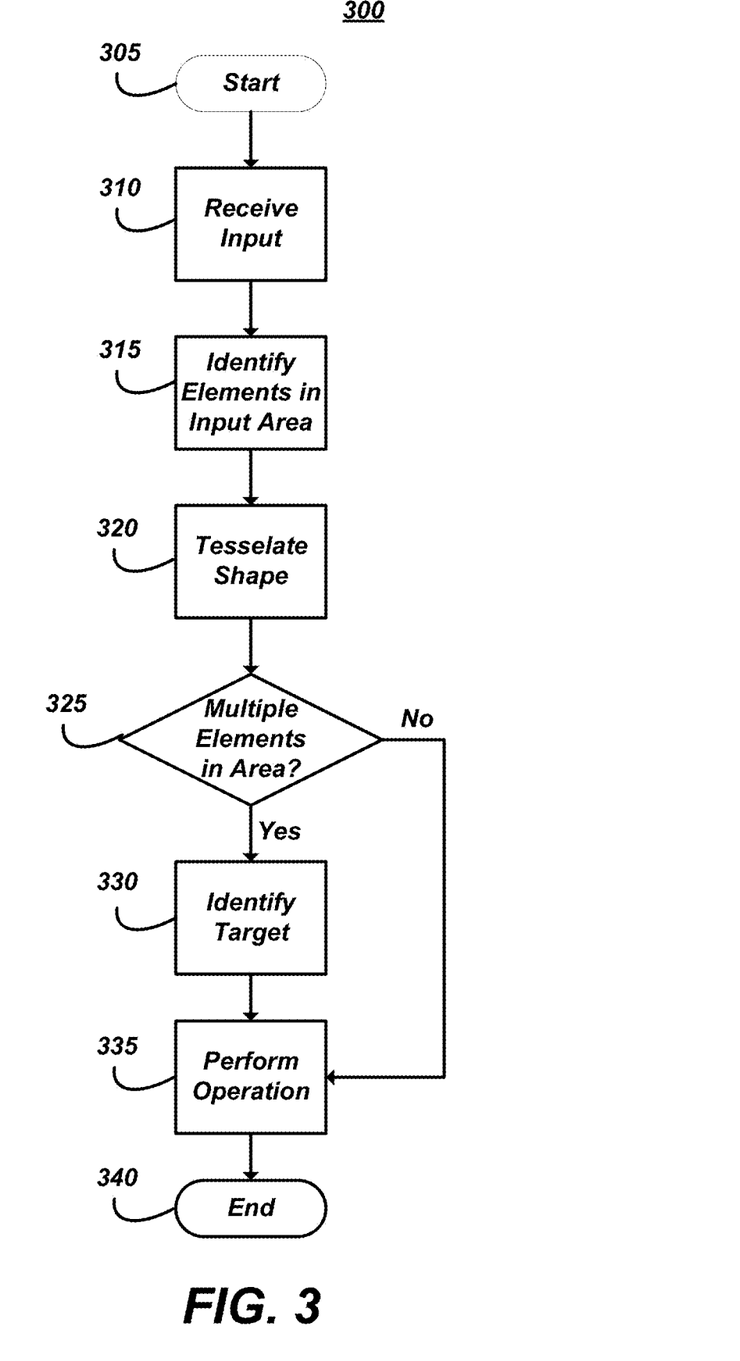
FIG. 3 is a flow chart of a method for providing shape hit testing.

FIG. 3 is a flow chart setting forth the general stages involved in a method 300 consistent with an embodiment of the invention for providing shape hit testing. Method 300 may be implemented using a computing device 400 as described in more detail below with respect to FIG. 4. Ways to implement the stages of method 300 will be described in greater detail below. Method 300 may begin at starting block 305 and proceed to stage 310 where computing device 400 may receive an input. For example, an input may be received on display 110 such as by a user's spoken commands, gestures, touch and/or a stylus.

Method 300 may then advance to stage 315 where computing device 400 may identify one and/or more elements displayed within the input area. For example, the input area may comprise input area 220 of user interface 200 in which vector-based shapes 210(A)-(B) are displayed.

Method 300 may then advance to stage 320 where computing device 400 may tessellate the element into a polygon-based shape. For example, the vector-based shape may be translated into a representation comprising a plurality of triangles of a predefined size. In cases where the element comprises a line, the line shape may be padded by a configurable amount of pixels before tessellation. In cases where the element comprises a hollow area, a cut may be created in the vector-based shape to create a single contiguous boundary. Similarly, multiple hollow areas may result in multiple cuts to create a contiguous perimeter.

Other conditions may result in additional processing to create the polygon-based shape. For example, where the element comprises a three-dimensional shape, an outer boundary for the three-dimensional shape may be identified and the area within that boundary may be tessellated into a polygon regardless of any ancillary shapes within the three-dimensional shapes (e.g., interior lines of squares that comprise the faces of a cube may be ignored.) Shapes comprising discontiguous fragments within the selection area, such as the tips of a horseshoe type shape, may be identified as belonging to a single shape. As each fragment is further processed, the fragments may be tracked and tied back to the single overall shape as displayed on the user interface.

Method 300 may then advance to stage 325 where computing device 400 may determine whether the input area comprises at least a subset of the plurality of elements. For example, the input area may comprise only a single element that may be identified as the target element of the input. In some cases, multiple elements may be displayed, in whole and/or in part, within the input area as illustrated above at least in FIG. 2A and FIG. 2B.

If multiple elements are displayed in the input area, method 300 may advance to stage 330 where computing device 400 may identify a most likely target of the input from among the subset of the plurality of elements according to a ranking criteria. The ranking criteria may comprise, for example, whether the element within the input area is occluded by other elements, reducing its relative area within the input area. Another example criteria may comprise an application priority associated with one and/or more of the elements, such as where the input area comprises a particular element of high importance to the application. Further example criteria may comprise a relative size of each element within and/or outside the input area, and a distance from a center point of the input area for each of the subset of the plurality of elements. The center point may be defined according to an initial point of contact and/or a final point of contact. In some cases, these points may be different due to movement of the input device (e.g., a finger and/or stylus) while in contact with the display and/or due to a user's gestures to select a portion of the display.

After identifying the most likely target at stage 330, or if only one element was identified at stage 325, method 300 may advance to stage 335 where computing device 400 may execute an operation associated with the most likely target of the input. For example, user interface 200 may display feedback to the user indicating which element was selected. For another example, an application associated with the target element may be notified of the selection and may execute appropriate operations (e.g., selection of a 'menu' element may cause the application to generate a menu for display.) Method 300 may then end at stage 340.

An embodiment consistent with the invention may comprise a system for providing shape hit testing. The system may comprise a memory storage and a processing unit coupled to the memory storage. The processing unit may be operative to receive an input comprising an area of a user interface, identify at least one user interface element associated with the area of the user interface, create a polygon-based representation of the at least one user interface element, determine whether the input comprises a selection of the at least one user interface element according to the polygon-based representation, and, if so, perform an operation associated with the at least one user interface element.

Another embodiment consistent with the invention may comprise a system for providing shape hit testing. The system may comprise a memory storage and a processing unit coupled to the memory storage. The processing unit may be operative to receive an input to an area of a user interface, identify a plurality of user interface elements displayed within the input area of the user interface, each of which may comprise a vector-based shape, tessellate each of the plurality of user interface elements into a polygon-based shape, identify at least one of the plurality of user interface elements that comprises a most likely target of the input, and execute an operation associated with the identified at least one of the plurality of user interface elements.

Yet another embodiment consistent with the invention may comprise a system for providing shape hit testing. The system may comprise a memory storage and a processing unit coupled to the memory storage. The processing unit may be operative to receive a touch input to an area of a user interface comprising a plurality of elements each comprising a vector-based shape, identify at least one of the plurality of elements displayed within the input area of the user interface, and tessellate the at least one of the plurality of elements into a polygon-based shape. Being operative to tessellate the at least one of the plurality of elements may comprise the processing unit being operative to pad each element determined to comprise a line by a configurable amount of pixels, create at least one cut in the vector-based shape of each element determined to comprise a hollow area, and identify an outer boundary for each element determined to comprise a three-dimensional shape.

The processing unit may be further operative to determine whether the input area comprises at least a subset of the plurality of elements and, if so, identify a most likely target of the input from among the subset of the plurality of elements according to one and/or more ranking criteria. The ranking criteria may consider, for example, an occlusion of each of the subset of the plurality of elements, an application priority associated with each of the subset of the plurality of elements, a relative size of each of the subset of the plurality of elements within the input area, a relative size of each of the subset of the plurality of elements outside the input area, a relation between a plurality of fragments each associated with a single element, and/or a distance from a center point of the input area for each of the subset of the plurality of elements. For example, an element with multiple fragments within the selection area may be ranked more highly by considering the total area of the multiple fragments within the input area. The processing unit may be further operative to execute an operation associated with the most likely target of the input.

Figure 4:
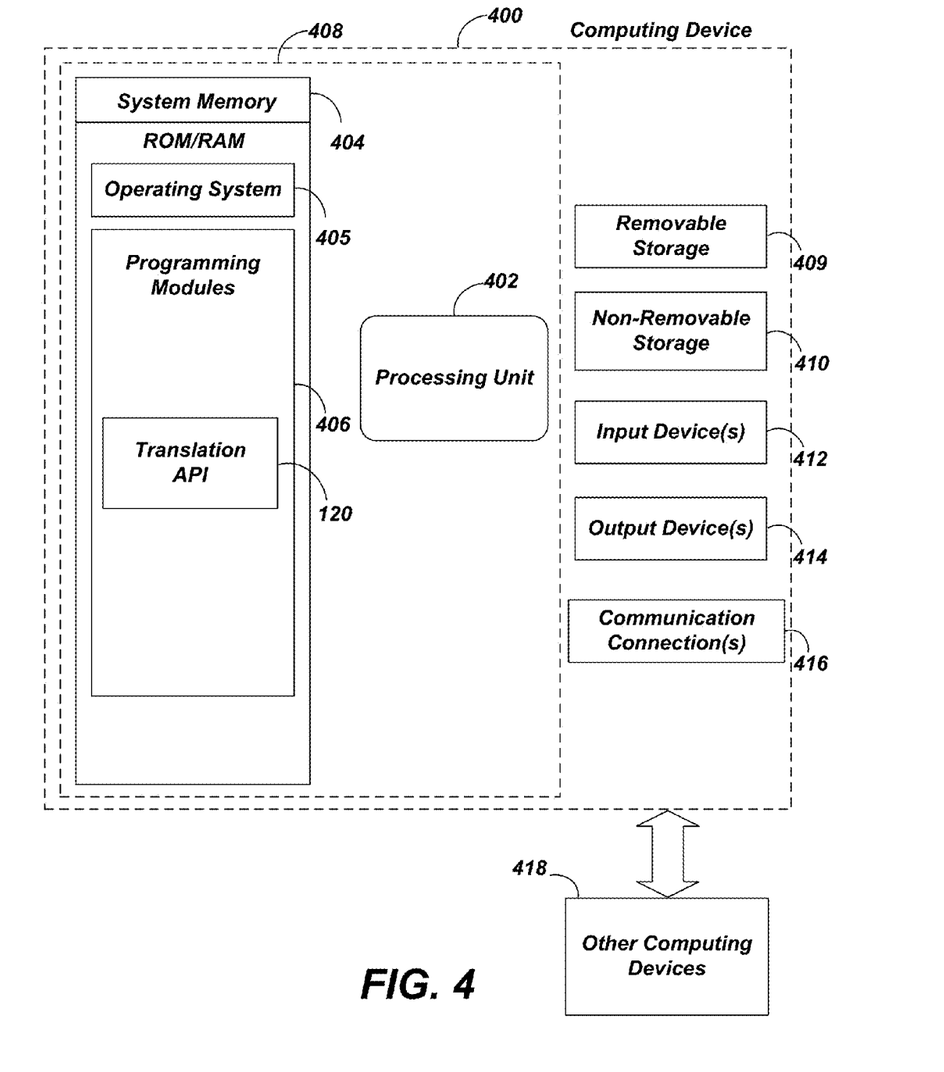
FIG. 4 is a block diagram of a computing device.

FIG. 4 is a block diagram of a system including computing device 400. Consistent with an embodiment of the invention, the aforementioned memory storage and processing unit may be implemented in a computing device, such as computing device 400 of FIG. 4. Any suitable combination of hardware, software, or firmware may be used to implement the memory storage and processing unit. For example, the memory storage and processing unit may be implemented with computing device 400 or any of other computing devices 418, in combination with computing device 400. The aforementioned system, device, and processors are examples and other systems, devices, and processors may comprise the aforementioned memory storage and processing unit, consistent with embodiments of the invention. Furthermore, computing device 400 may comprise user device 100 as described above. Methods described in this specification may operate in other environments and are not limited to computing device 400.

With reference to FIG. 4, a system consistent with an embodiment of the invention may include a computing device, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination. System memory 404 may include operating system 405, one or more programming modules 406, and may comprise translation API 120. Operating system 405, for example, may be suitable for controlling computing device 400's operation. Furthermore, embodiments of the invention may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computing device 400 may also contain a communication connection 416 that may allow device 400 to communicate with other computing devices 418, such as over a network in a distributed computing environment, for example, an intranet or the Internet. Communication connection 416 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 404, including operating system 405. While executing on processing unit 402, programming modules 406 (e.g., translation API 120) may perform processes and/or methods as described above. The aforementioned process is an example, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Figure 5A:
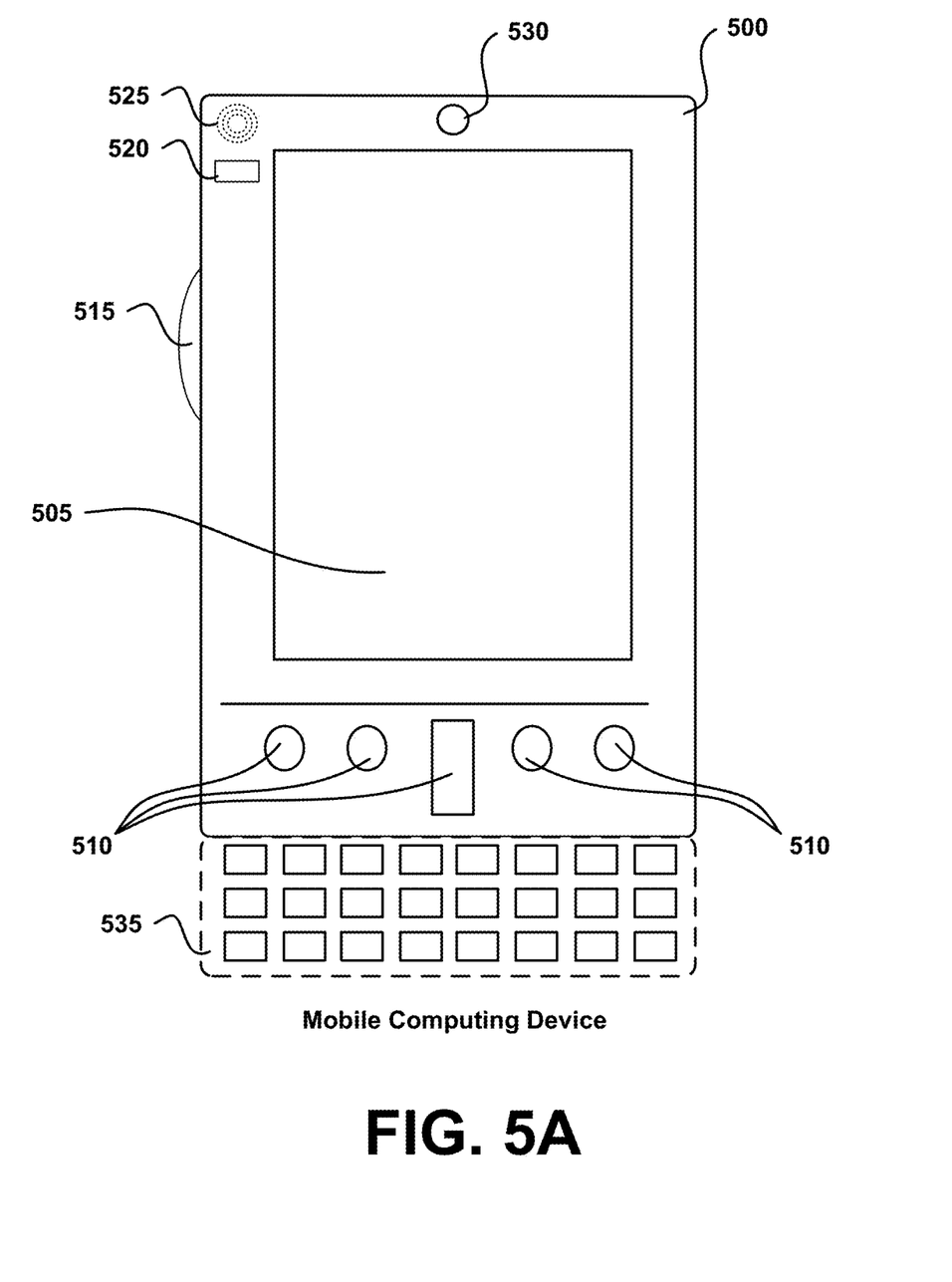
FIGS. 5A-5B are simplified block diagrams of a mobile computing device with which embodiments of the present disclosure may be practiced.
Figure 5B:
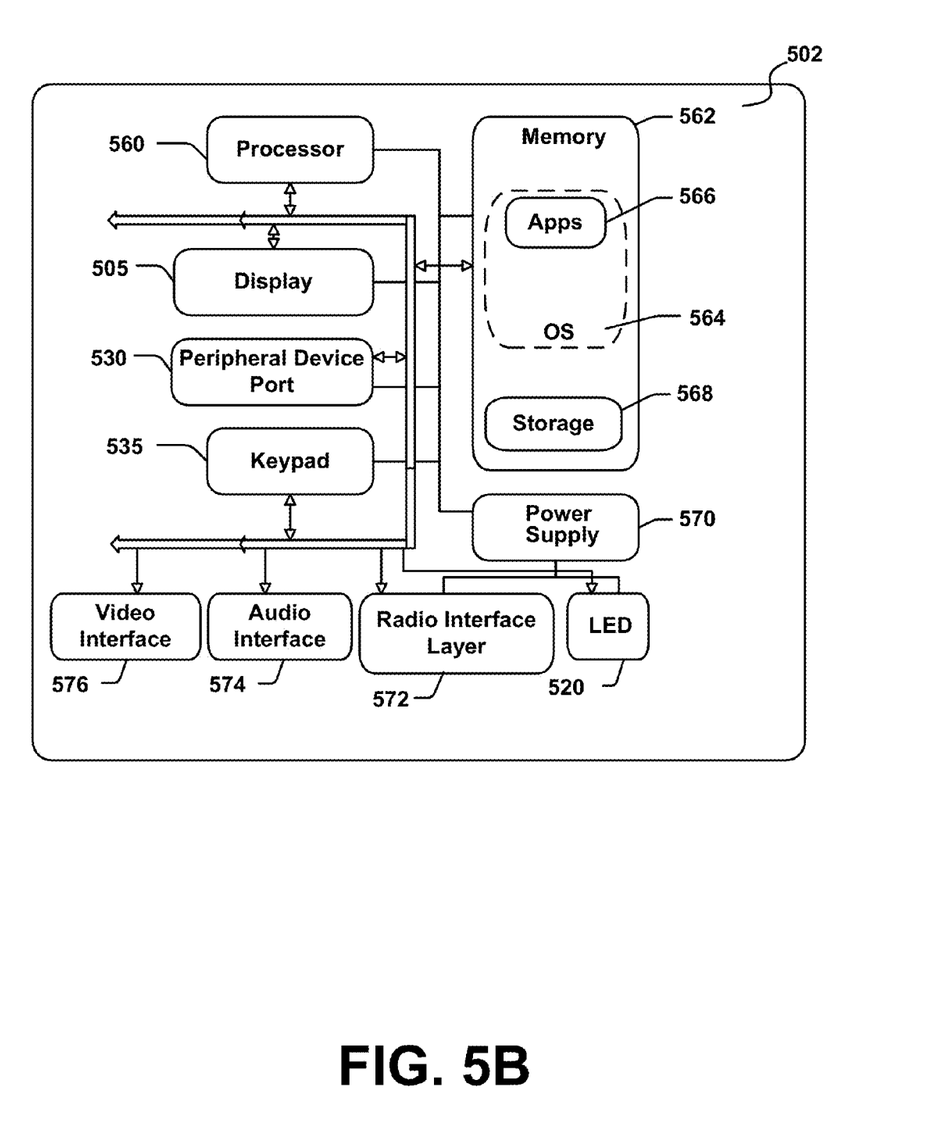

FIGS. 5A and 5B illustrate a mobile computing device 500, for example, a mobile telephone, a smart phone, a tablet personal computer, a laptop computer, and the like, with which embodiments of the invention may be practiced. With reference to FIG. 5A, an exemplary mobile computing device 500 for implementing the embodiments is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative embodiments, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some embodiments, the mobile computing device 500 incorporates a vibration transducer for providing the user with tactile feedback. In yet another embodiment, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one embodiment of a mobile computing device. That is, the mobile computing device 500 can incorporate a system (i.e., an architecture) 502 to implement some embodiments. In one embodiment, the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

The system 502 has a power supply 570, which may be implemented as one or more batteries. The power supply 570 might further include an external power source, such as an AC adapter or a powered docking cradle that supplements or recharges the batteries. The system 502 may also include a radio 572 that performs the function of transmitting and receiving radio frequency communications. The radio 572 facilitates wireless connectivity between the system 502 and the "outside world", via a communications carrier or service provider. Transmissions to and from the radio 572 are conducted under control of the operating system 564. In other words, communications received by the radio 572 may be disseminated to the application programs 566 via the operating system 564, and vice versa.

The radio 572 allows the system 502 to communicate with other computing devices, such as over a network. The radio 572 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 502 provides notifications using the visual indicator 520 that can be used to provide visual notifications and/or an audio interface 574 producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568. Computer storage media may include volatile and nonvolatile, removable and non-removable media implemented in any method or technology for storage of information, such as computer readable instructions, data structures, program modules, or other data.

Data/information generated or captured by the mobile computing device 500 and stored via the system 502 may be stored locally on the mobile computing device 500, as described above, or the data may be stored on any number of storage media that may be accessed by the device via the radio 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio 572 or via a distributed computing network. Similarly, such data/information may be readily transferred between computing devices for storage and use according to well-known data/information transfer and storage means, including electronic mail and collaborative data/information sharing systems.

Figure 6:
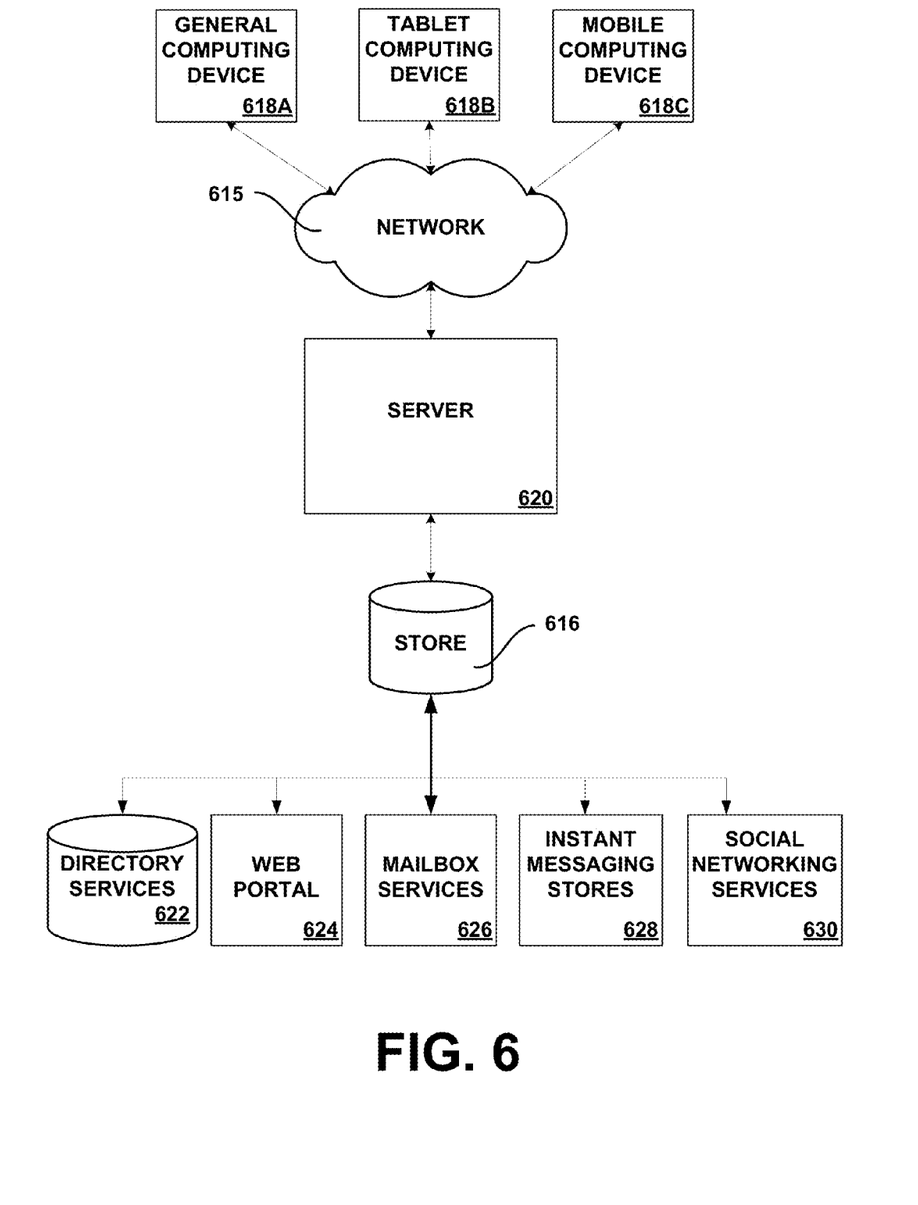
FIG. 6 is a simplified block diagram of a distributed computing system in which embodiments of the present disclosure may be practiced.

FIG. 6 illustrates one embodiment of the architecture of a system for providing applications to one or more client devices, as described above. Content developed, interacted with or edited in association with such applications may be stored in different communication channels or other storage types. For example, various documents may be stored using a directory service 622, a web portal 624, a mailbox service 626, an instant messaging store 628, or a social networking site 630. An email client application, for example, may use any of these types of systems or the like for enabling co-authoring conflict resolution via comments, as described herein. A server 620 may provide applications to the clients. As one example, the server 620 may be a web server providing an email client application over the web. The server 620 may provide the email client application over the web to clients through a network 615. By way of example, the client computing device 618 may be implemented as computing device 400 and embodied in a personal computer 618a, a tablet computing device 618b and/or a mobile computing device 618c (e.g., a smart phone). Any of these embodiments of the client computing device 618 may obtain content from the store 616. In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, may operate via application-specific logic integrated with other components of the computing device/system X on the single integrated circuit (chip).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicants. The Applicants retain and reserve all rights in the code included herein, and grant permission to reproduce the material only in connection with reproduction of the granted patent and for no other purpose.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method for providing shape hit testing, the method comprising:
    receiving a touch input at an area of a user interface;
    identifying at least one user interface element associated with the area of the user interface being comprised of a tessellated element, wherein the tessellated element is a polygon-based shape translated from a vector graphic;
    determining whether the touch input comprises a selection of the at least one user interface element according to the polygon-based shape; and
    in response to determining that the touch input comprises the selection of the at least one user interface element according to the polygon-based shape, performing an operation associated with the at least one user interface element.

2. The method of claim 1, wherein at least a portion of the at least one user interface element is displayed within the area of the user interface.

3. The method of claim 2, wherein the at least one user interface element comprises a line.

4. The method of claim 3, further comprising padding the line by a configurable amount of pixels.

5. The method of claim 4, further comprising tessellating the padded line into a polygon-based shape.

6. The method of claim 5, further comprising tessellating an area enclosed by the closed path into a polygon-based shape.

7. The method of claim 2, wherein the at least one user interface element comprises a closed path.

8. The method of claim 2, wherein the at least one user interface element comprises a three-dimensional shape.

9. The method of claim 8, further comprising:
    identifying an outer boundary for the three-dimensional shape; and
    tessellating an area enclosed by the outer boundary into a polygon-based shape.

10. The method of claim 1, wherein receiving the touch input at the area of the user interface wherein the area identified by the touch input includes a plurality of user interface elements in the area.

11. A system for providing shape hit testing, the system comprising:
    a memory storage device; and
    a processing unit coupled to the memory storage device, wherein the processing unit is operable to:
        receive a touch input at an area of a user interface;
        identify a plurality of user interface elements displayed at the area of the user interface, wherein each of the plurality of user interface elements are comprised of a tessellated element, wherein the tessellated element is a polygon-based shape translated from an vector graphic;
        identify one of the plurality of user interface elements that comprises a target of the touch input; and
        execute an operation associated with the one of the plurality of user interface elements.

12. The system of claim 11, wherein being operative to execute the operation associated with the one of the plurality of user interface elements comprises being operative to provide a feedback to the user interface indicating that the one of the plurality of user interface elements comprises the target.

13. The system of claim 11, wherein the plurality of user elements displayed within the area of the user interface comprises at least one user element of which only a portion of the vector-based shape is displayed within the area of the user interface.

14. The system of claim 11, wherein being operative to identify one of the plurality of user interface elements that comprises the target of the touch input comprises being operative to rank each of the polygon-based shapes associated with the plurality of user interface elements according to a ranking criteria.

15. The system of claim 14, wherein the ranking criteria comprises a relative area of the polygon-based shape within the area.

16. The system of claim 14, wherein the ranking criteria comprises a distance from a center point of the area.

17. The system of claim 16, wherein the center point of the area comprises a first point of contact of the touch input.

18. The system of claim 16, wherein the center point of the area comprises a final point of contact of the touch input.

19. The system of claim 11, wherein being operative to tessellate each of the plurality of user interface elements into a polygon-based shape comprises being operative to:
    determine whether a hollow portion exists in the vector-based shape of at least one of the plurality of user elements; and
    in response to determining that the hollow portion exists in the vector-based shape of the at least one of the plurality of user elements, create at least one cut in the vector-based shape of the at least one of the plurality of user elements.

20. A computer-readable memory storage device which stores a set of instructions which when executed performs a method for providing shape hit testing, the method executed by the set of instructions comprising:
    receiving a touch input at an area of a user interface comprising a plurality of elements each comprising a vector-based shape;

identifying at least one of the plurality of elements displayed at the area of the user interface;
tessellating the at least one of the plurality of elements into a polygon-based shape, wherein tessellating the at least one of the plurality of elements comprises:
  determining whether the at least one element comprises a line,
  in response to determining that the at least one element comprises a line, padding the line by a configurable amount of pixels,
  determining whether the at least one user interface element comprises a hollow area,
  in response to determining that the at least one user interface element comprises the hollow area, creating at least one cut in the vector-based shape of the at least one of the plurality of user elements,
  determining whether the at least one element comprises a three-dimensional shape, and
  in response to determining that the at least one element comprises the three-dimensional shape, identifying an outer boundary for the three-dimensional shape;

determining whether the area comprises at least a subset of the plurality of elements;

in response to determining that the area comprises the subset of the plurality of elements, identifying a target of the touch input from among the subset of the plurality of elements according to a ranking criteria comprising at least one of the following: an occlusion of each of the subset of the plurality of elements, an application priority associated with each of the subset of the plurality of elements, a relative size of each of the subset of the plurality of elements within the area, a relative size of each of the subset of the plurality of elements outside the area, a relation between a plurality of fragments each associated with a single element, and a distance from a center point of the area for each of the subset of the plurality of elements; and executing an operation associated with the target of the touch input.

* * * * *